(12) United States Patent
Nakamura (10) Patent No.: US 7,966,028 B2
(45) Date of Patent: Jun. 21, 2011

(54) WIRELESS BASE STATION DEVICE AND METHOD FOR CONTROLLING WIRELESS BASE STATION DEVICE

(75) Inventor: Yasuhiro Nakamura, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 646 days.

(21) Appl. No.: 12/094,592

(22) PCT Filed: Nov. 24, 2006

(86) PCT No.: PCT/JP2006/323416
§ 371 (c)(1),
(2), (4) Date: May 21, 2008

(87) PCT Pub. No.: WO2007/063769
PCT Pub. Date: Jun. 7, 2007

(65) Prior Publication Data
US 2009/0239560 A1    Sep. 24, 2009

(30) Foreign Application Priority Data
Nov. 29, 2005   (JP) .................. 2005-343358

(51) Int. Cl.
*H04B 7/00* (2006.01)
(52) U.S. Cl. ....... 455/509; 455/464; 455/17; 455/452.1; 455/450; 375/219; 375/267
(58) Field of Classification Search .......... 455/62, 455/67.11, 101, 272, 436, 450, 562.1, 428, 455/451, 452.1, 452.2, 455, 456.5, 464, 17, 455/23, 509; 370/210, 252, 331, 338, 328, 370/329, 344; 375/219, 260, 261, 267, 341; 705/28; 714/752
See application file for complete search history.

(56) References Cited

U.S. PATENT DOCUMENTS

| | | | | |
|---|---|---|---|---|
| 5,907,585 A * | 5/1999 | Suzuki et al. | .................. | 375/324 |
| 6,583,901 B1 * | 6/2003 | Hung | ............... | 398/79 |
| 2003/0078010 A1 * | 4/2003 | Davis | .............. | 455/69 |
| 2005/0117630 A1 * | 6/2005 | Kishi | ............ | 375/147 |
| 2005/0135498 A1 * | 6/2005 | Yee | ................ | 375/267 |
| 2005/0227702 A1 | 10/2005 | Nishimura et al. | | |
| 2005/0254414 A1 * | 11/2005 | Suda et al. | .................... | 370/203 |
| 2006/0052122 A1 | 3/2006 | Matsui et al. | | |
| 2006/0250935 A1 * | 11/2006 | Hamamoto et al. | .......... | 370/203 |

FOREIGN PATENT DOCUMENTS

| | | |
|---|---|---|
| JP | 11-068641 | 3/1999 |
| JP | 2002-186019 | 6/2002 |

(Continued)

*Primary Examiner* — Tan Trinh
(74) *Attorney, Agent, or Firm* — DLA Piper LLP (US)

(57) ABSTRACT

The throughput of communication is enhanced in a wireless base station device communicating with each of a plurality of terminal devices according to a modulation scheme selected from a plurality of modulation schemes by using any one channel of a plurality of channels. The wireless base station device communicating with each of a plurality of terminal devices according to a modulation scheme selected from a plurality of modulation schemes by using any one channel of a plurality of channels includes a modulation scheme selection unit (42) for selecting a modulation scheme that can be employed in a channel for at least some of unused channels among the plurality of channels; a communication speed comparison unit (44) for comparing a communication speed of the selected modulation scheme, and a communication speed of a modulation scheme of a currently communicating channel; and a channel switching unit (46) for switching the any one channel of the plurality of channels for performing communication from the currently communicating channel to any one channel of the at least some of unused channels according to the comparison results.

8 Claims, 6 Drawing Sheets

FOREIGN PATENT DOCUMENTS

| | | |
|---|---|---|
| JP | 2003-319448 | 11/2003 |
| JP | 2004-120051 | 4/2004 |
| JP | 2005-020153 | 1/2005 |
| JP | 2005-026878 | 1/2005 |
| JP | 2005-086401 | 3/2005 |
| JP | 2005-137017 | 5/2005 |

* cited by examiner

12: WIRELESS BASE STATION DEVICE

FIG.3

|  | SLOT 1 (CURRENTLY COMMUNICATING) | SLOT 2 (UNUSED) | SLOT 3 (UNUSED) | SLOT 4 (UNUSED) |
|---|---|---|---|---|
| FREQUENCY 1 | – | 15 | 18 | 17 |
| FREQUENCY 2 | – | 22 | 23 | 20 |
| ⋮ | ⋮ | ⋮ | ⋮ | ⋮ |
| FREQUENCY k | – | 5 | 10 | 3 |
| ⋮ | ⋮ | ⋮ | ⋮ | ⋮ |

FIG.4

| MODULATION SCHEME | REQUIRED S/N RATIO | D/U RATIO DETERMINATION THRESHOLD VALUE (REQUIRED S/N RATIO + 1dB) |
|---|---|---|
| 64QAM | 24.3dB | 25.3dB |
| 32QAM | 21.2dB | 22.2dB |
| 16QAM | 18.3dB | 19.3dB |
| 8PSK | 16.8dB | 17.8dB |
| QPSK | 11.7dB | 12.7dB |
| BPSK | 8.8dB | 9.8dB |

COMMUNICATION SPEED : HIGH ↑

WIRELESS BASE STATION DEVICE AND METHOD FOR CONTROLLING WIRELESS BASE STATION DEVICE

TECHNICAL FIELD

The present invention relates to a wireless base station device and a method for controlling a wireless base station device, and particularly relates to a wireless base station device for communicating with each of a plurality of terminal devices according to a modulation scheme selected from a plurality of modulation schemes by using any one channel of a plurality of channels (transmission channels for wireless communication) based on frequency division multiplexing, time division multiplexing, or another multiplexing technique, and to a method for controlling a wireless base station device.

BACKGROUND ART

Adaptive modulation is a technique for enhancing transmission efficiency and improving signal quality and the use efficiency of radio waves by adaptively varying the modulation scheme according to the radio reception state. Specifically, when the radio reception state is good, the error rate is kept low even in a modulation scheme in which the number of modulation multi-values (hereinafter referred to as the multi-value number) is high. Therefore, a modulation scheme having a high multi-value number is switched to, and throughput is maximized. If the radio reception state deteriorates, a reduction in communication quality (an increase in the error rate) is prevented by employing a modulation scheme having a low multi-value number.

Figure 7:
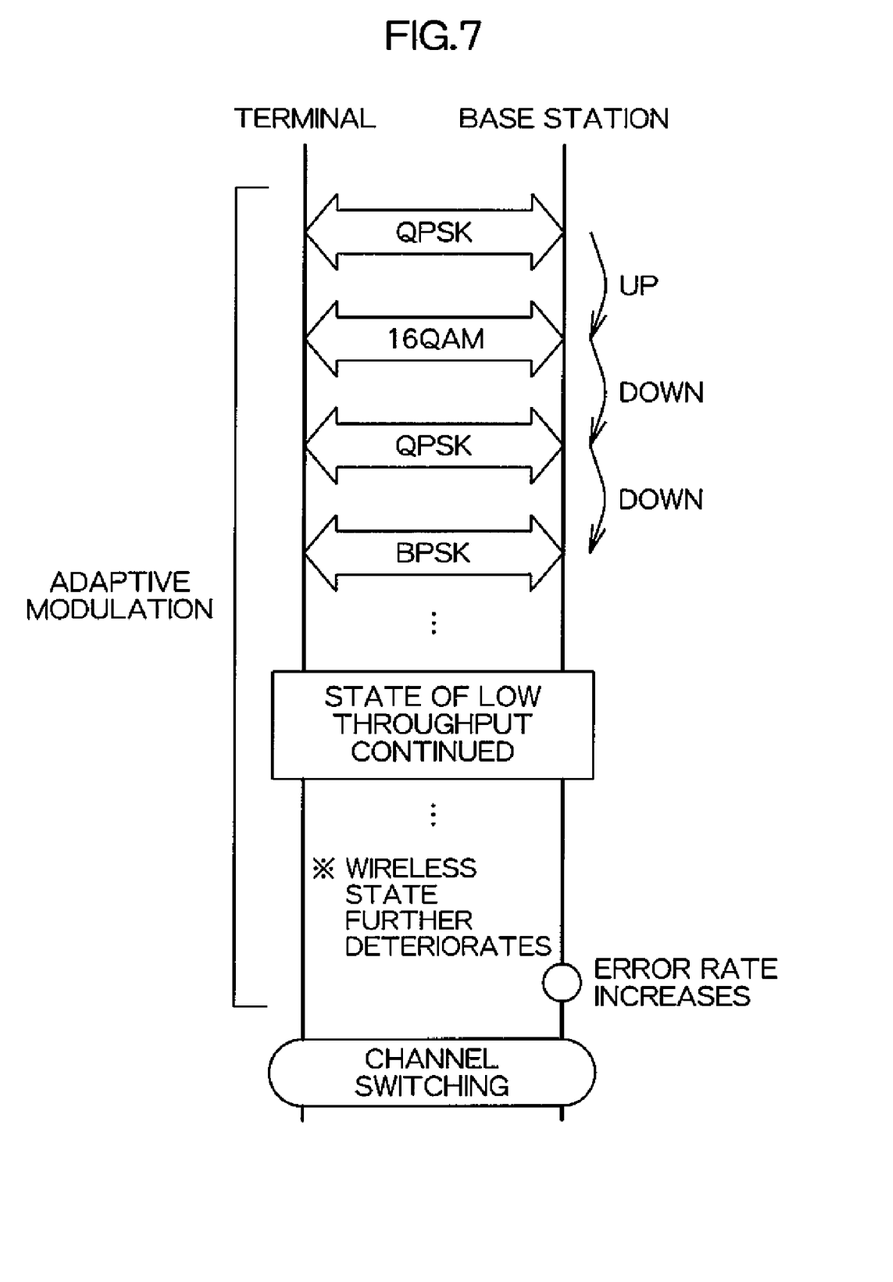
FIG. 7 is a conceptual diagram showing a conventional wireless communication system in which an adaptive modulation scheme is used.

FIG. 7 is a conceptual diagram showing a conventional wireless communication system that uses an adaptive modulation scheme. As shown in the diagram, the modulation scheme in the channel between the base station device and the terminal device is adaptively changed from the four-value modulation QPSK (Quadrature Phase Shift Keying) to the sixteen-value modulation 16QAM (Quadrature Amplitude Modulation), and then back to QPSK according to variation of the radio state. When the radio reception state deteriorates further, the modulation scheme of the channel is changed to the two-value modulation BPSK (Binary Phase Shift Keying), which is a modulation scheme having the smallest number of multi-values (hereinafter referred to as the minimum modulation scheme) in the system shown in the diagram. Although the throughput decreases when BPSK is utilized, errors are less likely to occur.

When the radio state further deteriorates, and the error rate correspondingly increases, it becomes impossible to maintain the required throughput even by BPSK, which is the minimum modulation scheme. In such a case, deterioration of communication quality is conventionally prevented by performing channel switching, handing over, or the like to another channel in which the radio reception state is good. Specifically, when the required communication quality becomes impossible to maintain merely by performing adaptive modulation in the same channel, the channel for communication is switched to another channel in which the reception state is good.

Patent Document 1 discloses a technique whereby wireless channel allocation is allowed only when the communication environment of a transmission channel is an environment that enables communication to be performed in accordance with a modulation scheme having a high multi-value number when there is a connection request from another wireless device in a wireless device that is adapted for adaptive modulation.

Patent Document 1: Japanese Laid-open Patent Application No. 2004-120051

DISCLOSURE OF THE INVENTION

Problems to be Solved by the Invention

However, in the abovementioned conventional wireless communication system, the communication channel is not switched unless the radio reception state deteriorates to such a state that errors occur even when the minimum modulation scheme is employed.

Therefore, even when another channel is available for which the reception state is better than the currently communicating channel, and for which a modulation scheme having a higher multi-value number or a modulation scheme having a lower error rate can be employed, the channel is not switched, and drawbacks occur in that communication is continued in a state of reduced throughput.

The present invention was developed in view of the drawbacks of the conventional technique described above, and an object of the present invention is to provide a wireless base station device capable of enhancing the throughput of communication, and to provide a method for controlling a wireless base station device.

Means for Solving the Problem

In order to achieve the abovementioned objects, a wireless base station device according to the present invention is a wireless base station device communicating with each of a plurality of terminal devices according to a modulation scheme selected from a plurality of modulation schemes by using any one channel of a plurality of channels, the wireless base station device includes modulation scheme selection means for selecting a modulation scheme that can be employed in a channel for at least some of unused channels among the plurality of channels; communication speed comparison means for comparing a communication speed of a modulation scheme selected by the modulation scheme selection means, and a communication speed of a modulation scheme of a currently communicating channel; and channel switching means for switching the any one channel of the plurality of channels for performing communication from the currently communicating channel to any one channel of the at least some of unused channels according to results of comparison by the communication speed comparison means.

The method for controlling a wireless base station device according to the present invention is a method for controlling a wireless base station device communicating with each of a plurality of terminal devices according to a modulation scheme selected from a plurality of modulation schemes by using any one channel of a plurality of channels, the method includes a modulation scheme selection step of selecting a modulation scheme that can be employed in a channel for at least some of unused channels among the plurality of channels; a communication speed comparison step of comparing a communication speed of a modulation scheme selected in the modulation scheme selection step, and a communication speed of a modulation scheme of a currently communicating channel; and a channel switching step of switching the any one channel of the plurality of channels for performing communication from the currently communicating channel to any one channel of the at least some of unused channels according to results of comparison in the communication speed comparison step.

According to the present invention, when any one channel of a plurality of channels is used to communicate with each of a plurality of terminal devices in accordance with a single modulation scheme selected from a plurality of modulation schemes, a modulation scheme that can be employed in a channel for at least some of unused channels in which the reception state is good among the plurality of channels is selected. The communication speed of the selected modulation scheme is compared with the communication speed of the modulation scheme of the currently communicating channel, and when there is an unused channel in which a potential exists for enhancing the communication speed, the channel used for communication is switched from the currently communicating channel to the unused channel. The channel used for communication can thereby be switched from the currently communicating channel to an unused channel in which a modulation scheme having a higher communication speed than the currently communicating channel can be employed, and the throughput of communication with the terminal device can be enhanced.

In another aspect of the present invention, the modulation scheme selection means includes reception state evaluation means for generating a reception state evaluation value indicating a reception state of a channel for the at least some of unused channels and selects a modulation scheme that can be employed in the channel on the basis of the reception state evaluation value of the at least some of unused channels that is generated by the reception state evaluation means. Through this configuration, a modulation scheme that can be employed in the channel can be selected based on a reception state evaluation value that indicates the reception state of an unused channel.

In another aspect of the present invention, the modulation scheme selection means further includes modulation scheme storage means for storing, in correlation with a range of the reception state evaluation value, a modulation scheme that can be employed in the range and selects a modulation scheme that can be employed in the channel from the modulation scheme storage means on the basis of the reception state evaluation value of the at least some of unused channels that is generated by the reception state evaluation means. Through this configuration, a modulation scheme that can be employed in the channel can be selected from the modulation scheme storage means on the basis of the reception state evaluation value of an unused channel.

In another aspect of the present invention, the communication speed comparison means performs the comparison when the modulation scheme of the currently communicating channel is a modulation scheme having the smallest communication speed among the modulation schemes stored in the modulation scheme storage means. Through this configuration, it becomes possible to switch the channel for performing communication from the currently communicating channel to an unused channel in which a modulation scheme can be employed that has a higher transmission speed than the currently communicating channel only when communication is being performed by the modulation scheme having the smallest communication speed.

In another aspect of the present invention, the reception state evaluation means further generates a reception state evaluation value of the currently communicating channel, and the at least some of unused channels are selected according to results of comparing a reception state evaluation value of the currently communicating channel, and reception state evaluation values of the unused channels generated by the reception state evaluation means. Through this configuration, it becomes possible to target only unused channels having a higher reception state evaluation value than the currently communicating channel to select a modulation scheme that can be employed in the channel on the basis of the reception state evaluation value.

In another aspect of the present invention, the reception state evaluation value is a value based on a size of an undesired wave reception level in each channel. The reception state evaluation value may also be a value indicating a difference in size between a reception level of a desired wave in the currently communicating channel and an undesired wave in each channel. Through this configuration, it becomes possible to select a modulation scheme that can be employed in the channel on the basis of the size of the undesired wave level in an unused channel in which the undesired wave level is lower than in the currently communicating channel.

BEST MODE FOR CARRYING OUT THE INVENTION

Figure 1:
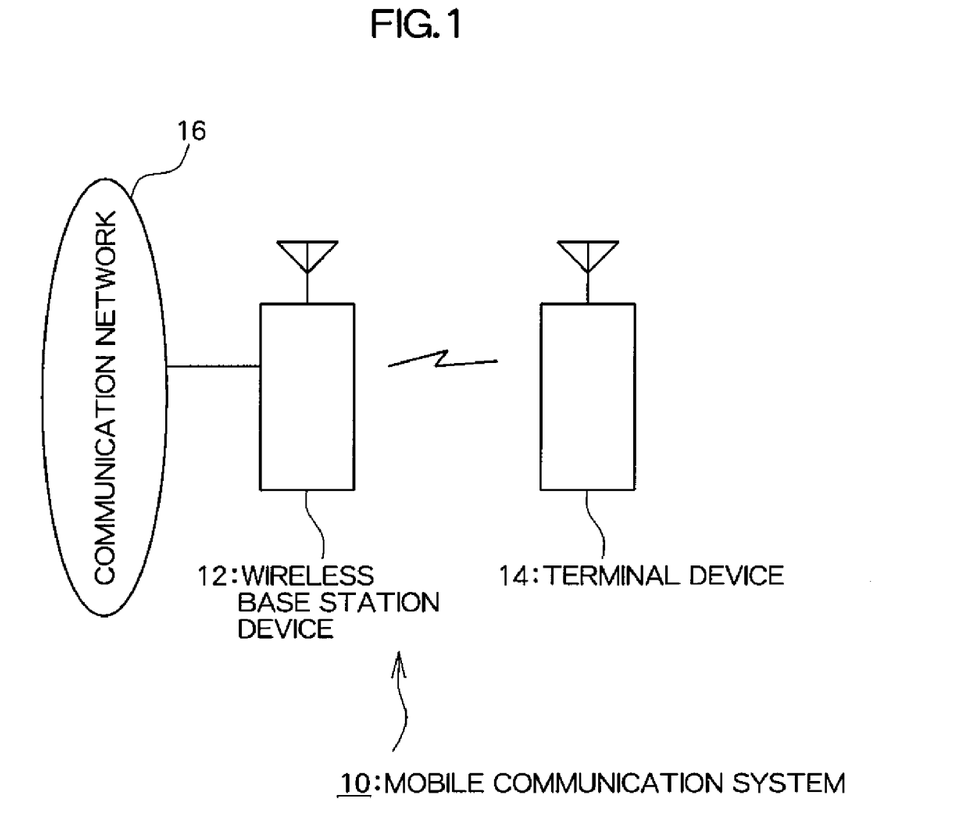
FIG. 1 is a block diagram of a mobile communication system according to an embodiment of the present invention.

Embodiments of the present invention will be described hereinafter with reference to the drawings. As shown in FIG. 1, the mobile communication system 10 according to an embodiment of the present invention includes a wireless base station device 12 connected by a wired transmission line to a communication network 16, and a terminal device 14 connected by a wireless transmission channel to the wireless base station device 12.

Figure 5:
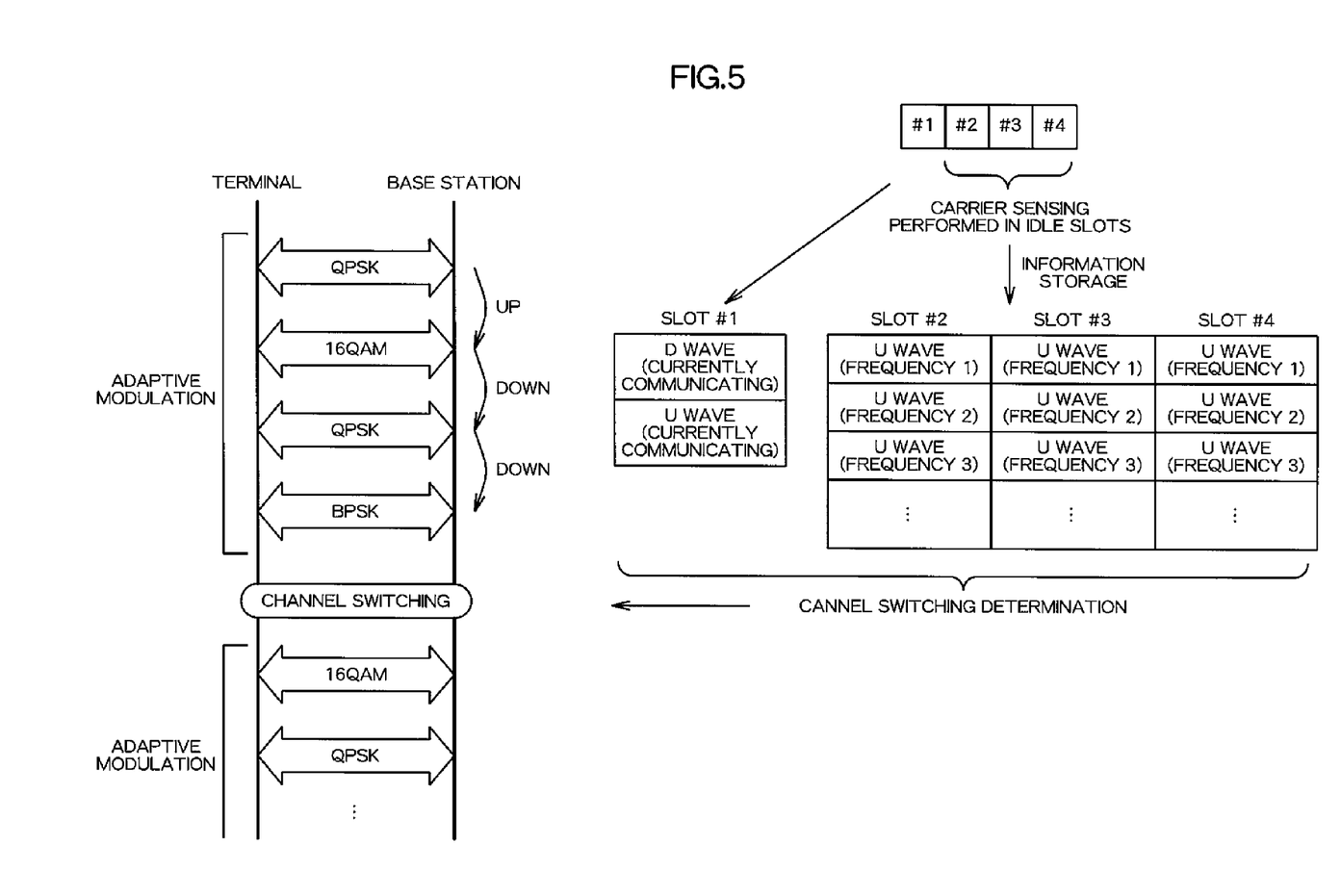
FIG. 5 is a conceptual diagram showing the adaptive modulation processing according to an embodiment of the present invention.

For convenience of description, the mobile communication system 10 is assumed to employ an adaptive modulation scheme and a time division multiplexing scheme. FIG. 5 is a conceptual diagram showing the adaptive modulation processing according to an embodiment of the present invention. As shown in this diagram, in the mobile communication system 10 that employs a time division multiplexing scheme, the wireless transmission channel between the wireless base station device 12 and the terminal device 14 is divided into a plurality of time slots for each of transmission and reception. This diagram shows an example in which a single time frame is composed of four time slots. In a wireless communication system that employs a time division multiplexing scheme, a channel is specified by a time slot number and a carrier frequency (carrier wave frequency).

In FIG. 5, slot 1 is a time slot allocated for communication with the terminal device 14. The received wave in slot 1 includes a desired wave (hereinafter referred to as a D wave) that is transmitted from the terminal device 14 currently communicating and an undesired wave (hereinafter referred to as a U wave). In slot 1 currently communicating by adaptive modulation, the sizes of the D wave level and the U wave level are continually measured in order to switch the modulation scheme. Slots 2, 3, and 4 are idle slots not allocated to communication with the terminal device 14. In each of the idle slots 2, 3, and 4, measurement (hereinafter referred to as carrier sensing) of the reception state is performed for each of one or more carrier frequencies (frequency 1, frequency 2, . . . ) at regular intervals until the time slot is allocated to communication. In carrier sensing, a value based on the size of the U wave level is measured for each of the carrier frequencies in each of the time slots. As shown in FIG. 5, the value based on the size of the newest U wave level obtained by carrier sensing, e.g., the newest reception RSSI (Receive Signal Strength Indication), is stored in correlation with the time slot number and the carrier frequency. This operation is performed to select a carrier frequency having a good reception state in any idle slot when a channel is allocated to communication. Since communication in the time slot is temporarily restricted during execution of carrier sensing, carrier sensing is accompanied by a decrease in throughput. Carrier sensing is therefore not performed in the currently communicating slot 1.

In the present embodiment, the wireless base station device 12 not only monitors the D wave and U wave of the currently communicating channel for adaptive modulation, but also determines whether to switch the channel for communication from the currently communicating channel to another unused channel on the basis of the value based on the sizes of the D wave level and U wave level in the currently communicating channel, and on the basis of the carrier sensing results (value based on the size of the U wave level) in the idle slot. Specifically, a comparison is made between the value based on the size of the U wave level in the currently communicating channel, and the value based on the size of the U wave level in the unused channel; and a determination is made as to whether an unused channel exists that has a better reception state (lower U wave level) than the currently communicating channel. When there is an unused channel that has a better reception state than the currently communicating channel, the best modulation scheme that can be employed in the unused channel is selected based on the size of the U wave level in the unused channel. A comparison is then made between the modulation scheme of the selected unused channel, and the modulation scheme of the currently communicating channel; and when the modulation scheme of the unused channel has a higher communication speed (the multi-value number is high, or the error rate is low even with the same multi-value number), the channel used for communication is switched from the currently communicating channel to the unused channel.

Figure 4:
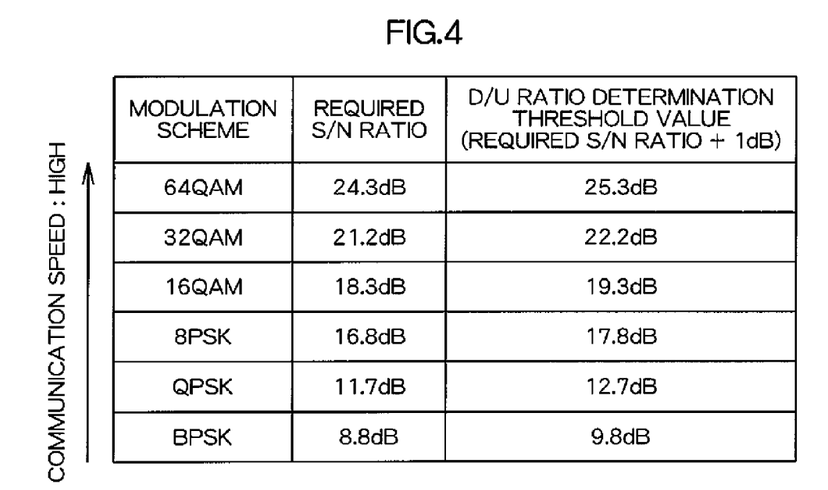
FIG. 4 is a diagram showing an example of a modulation scheme storage unit.

FIG. 5 shows an example in which an unused channel capable of employing 16QAM is determined to be present as a result of performing the abovementioned determination processing during communication in accordance with the minimum modulation scheme BPSK, and channel switching is therefore performed before the required throughput becomes impossible to maintain. The abovementioned determination processing may be executed when the currently communicating channel is employing the minimum modulation scheme, or at any time regardless of the modulation scheme of the currently communicating channel. For example, the communication channel may be switched to an unused channel capable of employing 16QAM while communication is taking place in accordance with QPSK, which has a lower communication speed than 16QAM, as shown in FIG. 4.

In the present embodiment as described above, when there is an unused channel in which the reception state is better than that of the currently communicating channel, and in which a modulation scheme can be employed that has a higher multi-value number or a lower error rate than the currently communicating channel, the channel for communication is switched from the currently communicating channel to the unused channel, and the throughput of communication can therefore be enhanced. The value based on the size of the U wave level that is used in the abovementioned determination may be a value (hereinafter, the D/U ratio) that indicates the difference in the sizes of the D wave level in the currently communicating channel and the U wave level in each channel.

The functions of each constituent element of the wireless base station device 12 according to the present embodiment will be specifically described hereinafter based on FIG. 2.

Figure 2:
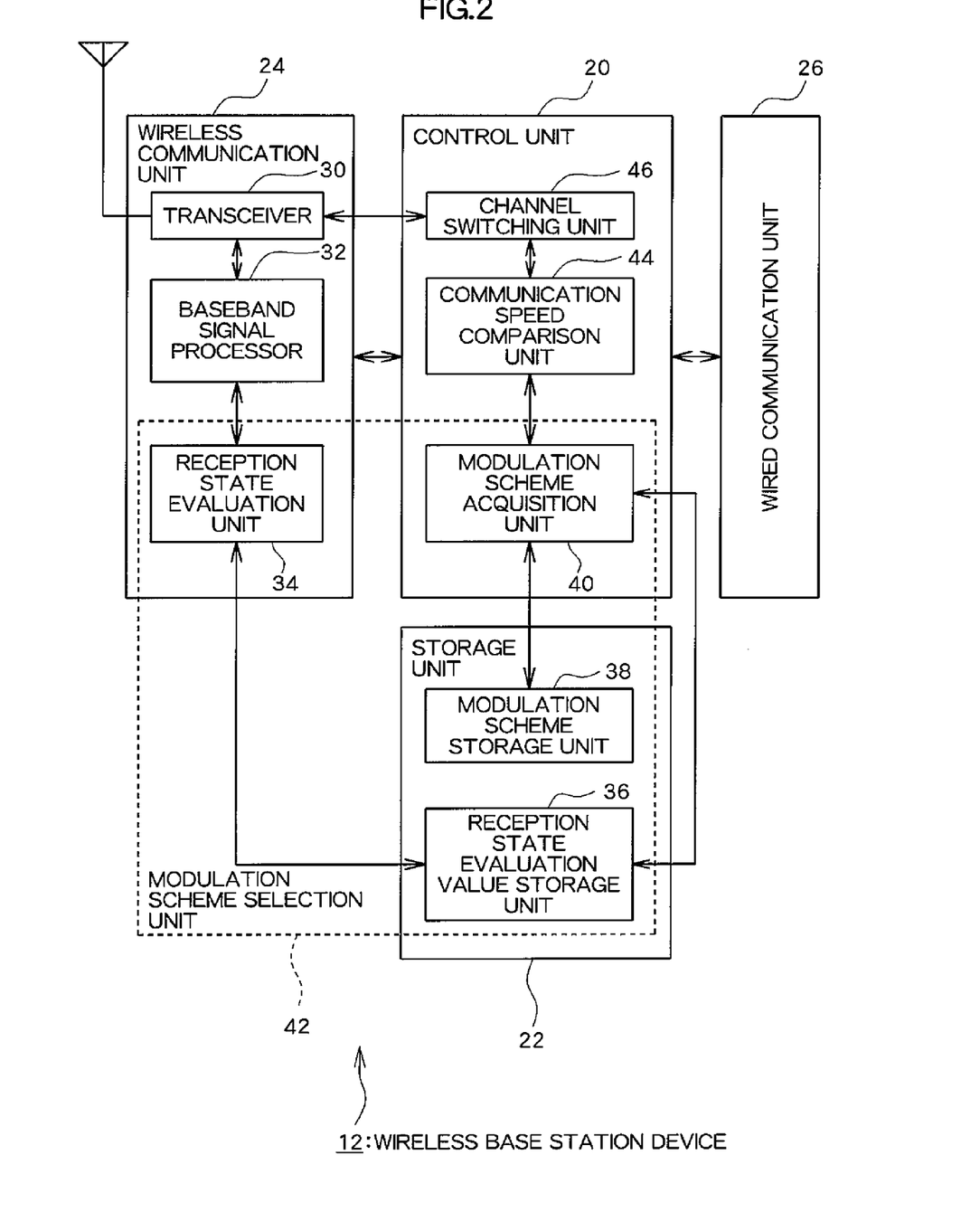
FIG. 2 is a functional block diagram of a wireless base station device according to an embodiment of the present invention.

As shown in FIG. 2, the wireless base station device 12 includes a control unit 20, a storage unit 22, a wireless communication unit 24, and a wired communication unit 26. The control unit 20 controls each unit of the wireless base station device 12 and executes processing relating to voice and data communication. The wireless communication unit 24 has an antenna; receives and demodulates voice signals, communication packets, or the like from the terminal device 14; and outputs to the control unit 20. The wireless communication unit 24 modulates voice signals, communication packets, or other inputs from the control unit 20 and outputs via the antenna, in accordance with the instructions of the control unit 20. The storage unit 22 operates as a working memory for the control unit 20. The storage unit 22 also stores programs, parameters, tables, and the like relating to the various types of processing performed by the control unit 20. The wired communication unit 26 connects to the communication network 16 and receives voice signals, communication packets, or the like from the communication network 16 and outputs to the control unit 20. The wired communication unit 26 transmits voice signals, communication packets, or the like to the communication network 16 in accordance with the instructions of the control unit 20.

The wireless communication unit 24 includes a transceiver 30, a baseband signal processor 32, and a reception state evaluation unit 34. The transceiver 30 transmits and receives data to and from the terminal device 14 via the antenna in accordance with an instruction from the control unit 20. The baseband signal processor 32 extracts a baseband signal from a received signal outputted from the transceiver 30, and sends the extracted baseband signal to the control unit 20 and other components.

The reception state evaluation unit 34 performs carrier sensing in at least some of the idle slots and generates a reception state evaluation value that indicates the reception state of the channel for at least some of the unused channels. Specifically, the reception state evaluation unit 34 measures the reception state of one or a plurality of carrier frequencies in the idle slot on the basis of the received signal in the idle slot acquired via the transceiver 30. Since the idle slot is not used in communication, the signals received in the idle slot can all be considered to be undesired signals. The reception state evaluation value of the at least some of unused channels can be considered to be a value that is based on the size of the U wave level in each carrier frequency in at least some of the idle slots.

Furthermore, the reception state evaluation unit 34 generates a reception state evaluation value in the currently communicating channel. Specifically, the reception state evaluation unit 34 separates a desired signal and an undesired signal from the received signal in the currently communicating channel, and calculates values based on the sizes of the D wave level and the U wave level from each of the separated signals. The reception state evaluation value of the currently communicating channel may be a value based on the size of the U wave level in the currently communicating channel, or a value (D/U ratio) indicating the difference in the sizes of the D wave level and U wave level in the currently communicating channel. The reception state evaluation value of the at least some of the unused channels may be a value (D/U ratio) indicating the difference in size between the D wave level in the currently communicating channel, and the U wave level in each carrier frequency in at least some of the idle slots.

Figure 3:
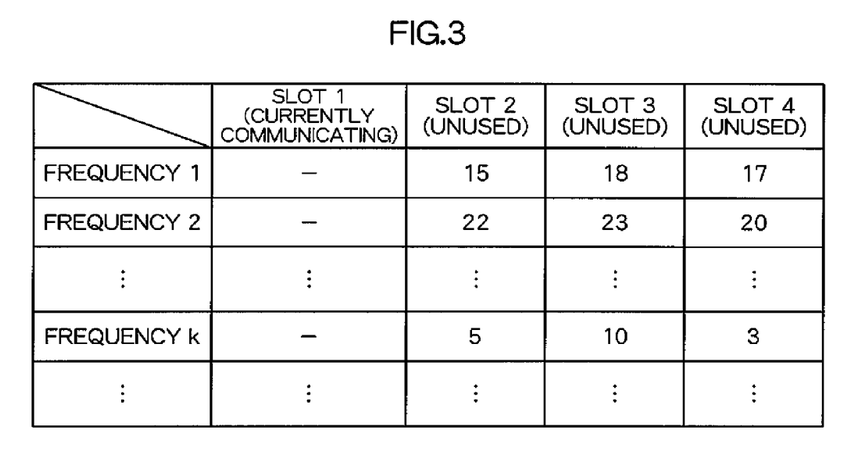
FIG. 3 is a diagram showing an example of a reception state evaluation value storage unit.

The storage unit 22 includes a reception state evaluation value storage unit 36 and a modulation scheme storage unit 38. The reception state evaluation value storage unit 36 stores the reception state evaluation value generated by the reception state evaluation unit 34. As shown in FIG. 3, the reception state evaluation unit 34 stores, for example, the value based on the size of the U wave level for each carrier frequency in an idle slot in correlation with the time slot number and the carrier frequency. In this diagram, a case is shown in which slot 1 is currently communicating, and slots 2, 3, and 4 are idle slots.

The modulation scheme storage unit 38, in correlation with a range of reception state evaluation values, stores a modulation scheme that can be employed in the range. FIG. 4 shows an example of the modulation scheme storage unit 38. As shown in this diagram, for example, the modulation scheme storage unit 38, in correlation with a D/U ratio determination threshold value, stores the best modulation scheme that can be employed at the D/U ratio determination threshold value. A value in which 1 dB is added to the required S/N ratio necessary to employ the corresponding modulation scheme is used as the D/U ratio determination threshold value. According to the example shown in FIG. 4, when the D/U ratio in a communication channel is 15.0 dB, the D/U ratio exceeds the D/U ratio determination threshold value of 12.7 dB for QPSK, and it is therefore apparent that communication can be performed according to BPSK or QPSK in the communication channel. In this case, QPSK is employed as the best modulation scheme.

The control unit 20 includes a modulation scheme acquisition unit 40, a communication speed comparison unit 44, and a channel switching unit 46.

The modulation scheme acquisition unit 40 acquires a modulation scheme that can be employed in the channel from the modulation scheme storage unit 38 on the basis of the reception state evaluation values of the at least some of unused channels that are generated by the reception state evaluation unit 34 and stored in the reception state evaluation value storage unit 36. The reception state evaluation value of an unused channel may be a value based on the size of the U wave level in the channel, or a value (D/U ratio) indicating the difference in size between the U wave level in the channel and the D wave level in the currently communicating channel. For example, when the reception state evaluation value storage unit 36 is in the state shown in FIG. 3, the value based on the size of the D wave level in the currently communicating channel that is generated by the reception state evaluation unit 34 is 25.5 dBm, and the value based on the size of the U wave level in a certain unused channel that is stored in the reception state evaluation value storage unit 36 is 5.0 dBm (frequency k in slot 2 of FIG. 3), then the D/U ratio in the unused channel is 20.5 dB. In this case, the D/U ratio of 20.5 dB in the unused channel exceeds the D/U ratio determination threshold value of 19.3 dB for 16QAM in the modulation scheme storage unit 38. The modulation scheme acquisition unit 40 thus acquires 16QAM from the modulation scheme storage unit 38 as the best modulation scheme that can be employed in the unused channel.

A modulation scheme selection unit 42 is formed by the reception state evaluation unit 34, the reception state evaluation value storage unit 36, the modulation scheme storage unit 38, and the modulation scheme acquisition unit 40; and the modulation scheme selection unit 42 selects a modulation scheme that can be employed in the channel for at least some of the unused channels. Specifically, the modulation scheme acquired by the modulation scheme acquisition unit 40 from the modulation scheme storage unit 38 is selected as a modulation scheme that can be employed in the channel on the basis of the reception state evaluation value of the at least some of unused channels that is generated by the reception state evaluation unit 34 and stored in the reception state evaluation value storage unit 36.

The at least some of the unused channels is selected according to the results of comparing the reception state evaluation value of the currently communicating channel generated by the reception state evaluation unit 34, and the reception state evaluation values of each of the unused channels. In the present embodiment, since an object is to enhance the throughput of the currently communicating channel, the at least some of unused channels is selected from among unused channels in which the reception state is better (e.g., the U wave level is lower) than the currently communicating channel.

The communication speed comparison unit 44 compares the communication speed of the modulation scheme acquired by the modulation scheme acquisition unit 40 in the modulation scheme selection unit 42, and the communication speed of the modulation scheme of the currently communicating channel. For example, when the modulation scheme of the currently communicating channel is QPSK, and the modulation scheme acquired by the modulation scheme acquisition unit 40 is 16QAM, the communication speed comparison unit 44 determines that 16QAM has a higher communication speed than QPSK. In the example of the modulation scheme storage unit 38 shown in FIG. 4, since the modulation schemes are arranged in sequence with the highest communication speed at the top, the communication speed comparison unit 44 can determine the size of the communication speed according to the arrangement sequence. The modulation scheme storage unit 38 may store the communication speeds in correlation with the modulation schemes, and the communication speed comparison unit 44 may compare the communication speeds of the modulation schemes on the basis of the communication speeds stored in the modulation scheme storage unit 38.

The channel switching unit 46 switches any one channel of the plurality of channels for communication from the currently communicating channel to any one of at least some of the unused channels according to the results of comparison by the communication speed comparison unit 44. For example, when the modulation scheme of the currently communicating channel is QPSK, and the modulation scheme selected by the modulation scheme selection unit 42 is 16QAM, as described above, the communication speed comparison unit 44 determines that 16QAM has a higher communication speed than QPSK. The channel switching unit 46 then switches the channel for communication from the currently communicating channel to an unused channel in which 16QAM can be employed, according to the results of comparison by the communication speed comparison unit 44. When the channel is switched by the channel switching unit 46, the wireless base station device 12 uses the channel to communicate with the terminal device 14 by 16QAM via the transceiver 30 of the wireless communication unit 24. The throughput of communication between the wireless base station device 12 and the terminal device 14 can thereby be enhanced.

The comparison processing by the communication speed comparison unit 44 may be executed when the currently communicating channel is employing the minimum modulation scheme. The channel can thereby be switched when the currently communicating channel is employing the minimum modulation scheme. The comparison processing by the communication speed comparison unit 44 may be executed at any time regardless of the modulation scheme of the currently communicating channel. The channel can thereby be switched at any time regardless of the modulation scheme of the currently communicating channel.

Figure 6:
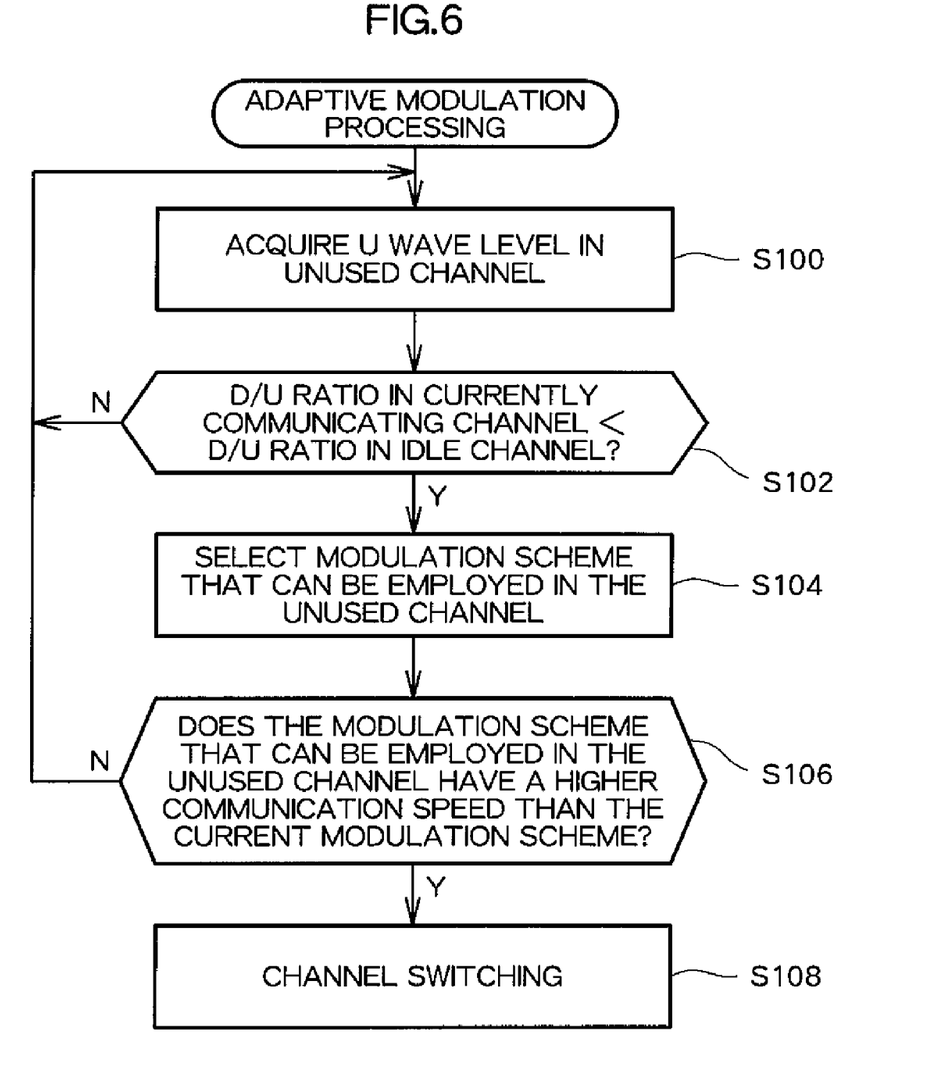
FIG. 6 is a flowchart showing the adaptive modulation processing according to an embodiment of the present invention.

The adaptive modulation processing according to an embodiment of the present invention will next be described based on the flowchart shown in FIG. 6. The reception state evaluation unit 34 regularly performs carrier sensing in each idle slot, generates a value based on the size of the U wave level that indicates the reception state of each unused channel, and stores the value based on the size of the U wave level in the reception state evaluation value storage unit 36 in correlation with a time slot number and a carrier frequency. The wireless base station device 12 performs the processing described below when the currently communicating channel is employing the minimum modulation scheme, or at any time regardless of the modulation scheme of the currently communicating channel.

The modulation scheme acquisition unit 40 acquires a value based on the size of the U wave level in each unused channel from the reception state evaluation value storage unit 36 (S100). The modulation scheme acquisition unit 40 then acquires a value based on the sizes of the U wave level and D wave level in the currently communicating channel from the reception state evaluation unit 34, and compares the D/U ratio in the currently communicating channel and the D/U ratio (ratio of the sizes of the D wave level in the currently communicating channel and the U wave level in each unused channel) in each unused channel (S102). When there is an unused channel having a larger D/U ratio (i.e., a low U wave level value in relation to the D wave level) than the currently communicating channel, the modulation scheme acquisition unit 40 acquires the best modulation scheme that can be employed in the unused channel from the modulation scheme storage unit 38 on the basis of the D/U ratio in the unused channel (S104). When there is no unused channel for which the D/U ratio is larger than that of the currently communicating channel, adaptive modulation processing is continued in the currently communicating channel.

The communication speed comparison unit 44 then compares the communication speed of the modulation scheme acquired by the modulation scheme acquisition unit 40, and the communication speed of the modulation scheme of the currently communicating channel (S106). When the communication speed of the modulation scheme acquired by the modulation scheme acquisition unit 40 is higher than that of the modulation scheme of the currently communicating channel, the channel switching unit 46 switches the channel for communication from the currently communicating channel to the unused channel capable of employing a modulation scheme that has a higher communication speed than the currently communicating channel (S108). When the modulation scheme of the currently communicating channel and the modulation scheme acquired by the modulation scheme acquisition unit 40 are the same, the channel is not switched, and adaptive modulation processing is continued in the currently communicating channel.

The wireless base station device described above makes it possible to switch the channel for communication from the currently communicating channel to an unused channel capable of employing a modulation scheme that has a higher communication speed than the currently communicating channel, and to enhance the throughput of communication with the terminal device.

The present invention is not limited to the embodiments described above. For example, a wireless base station device in a mobile communication system that employs an adaptive modulation scheme and a time division multiplexing scheme was described in the embodiments, but the present invention may also be applied to a wireless base station device that does not employ an adaptive modulation scheme or a time division multiplexing scheme, insofar as the wireless base station device communicates with each of a plurality of terminal devices according to a modulation scheme selected from a plurality of modulation schemes by using any one channel of a plurality of channels.

The invention claimed is:

1. A wireless base station device communicating with each of a plurality of terminal devices according to a modulation scheme selected from a plurality of modulation schemes by using any one channel of a plurality of channels, the wireless base station device comprising:

modulation scheme selection means for selecting a modulation scheme that can be employed in a channel for at least some of unused channels among the plurality of channels;

communication speed comparison means for comparing a communication speed of a modulation scheme selected by the modulation scheme selection means, and a communication speed of a modulation scheme of a currently communicating channel; and channel switching means for switching the any one channel of the plurality of channels for performing communication from the currently communicating channel to any one channel of the at least some of unused channels according to results of comparison by the communication speed comparison means.

2. The wireless base station device according to claim 1, wherein the modulation scheme selection means comprises reception state evaluation means for generating a reception state evaluation value indicating a reception state of a channel for the at least some of unused channels and selects a modulation scheme that can be employed in the channel on the basis of the reception state evaluation value of the at least some of unused channels that is generated by the reception state evaluation means.

3. The wireless base station device according to claim 2, wherein the modulation scheme selection means further comprises modulation scheme storage means for storing, in correlation with a range of the reception state evaluation value, a modulation scheme that can be employed in the range and selects a modulation scheme that can be employed in the channel from the modulation scheme storage means on the basis of the reception state evaluation value of the at least some of unused channels that is generated by the reception state evaluation means.

4. The wireless base station device according to claim 3, wherein the communication speed comparison means performs the comparison when the modulation scheme of the currently communicating channel is a modulation scheme having the smallest communication speed among the modulation schemes stored in the modulation scheme storage means.

5. The wireless base station device according to any of claims 2 through 4, wherein
the reception state evaluation means further generates a reception state evaluation value of the currently communicating channel; and
the at least some of unused channels are selected according to results of comparing a reception state evaluation value of the currently communicating channel, and reception state evaluation values of the unused channels generated by the reception state evaluation means.

6. The wireless base station device according to any of claims 2 through 4, wherein the reception state evaluation value is a value based on a size of an undesired wave reception level in each channel.

7. The wireless base station device according to claim 6, wherein the reception state evaluation value is a value indicating a difference in size between a reception level of a desired wave in the currently communicating channel and an undesired wave in each channel.

8. A method for controlling a wireless base station device communicating with each of a plurality of terminal devices according to a modulation scheme selected from a plurality of modulation schemes by using any one channel of a plurality of channels, the method comprising:
a modulation scheme selection step of selecting a modulation scheme that can be employed in a channel for at least some of unused channels among the plurality of channels;
a communication speed comparison step of comparing a communication speed of a modulation scheme selected in the modulation scheme selection step, and a communication speed of a modulation scheme of a currently communicating channel; and
a channel switching step of switching the any one channel of the plurality of channels for performing communication from the currently communicating channel to any one channel of the at least some of unused channels according to results of comparison in the communication speed comparison step.

* * * * *